United States Patent
Kawaharada (10) Patent No.: US 10,300,913 B2
(45) Date of Patent: May 28, 2019

(54) VEHICLE IDENTIFICATION DEVICE AND VEHICLE IDENTIFICATION METHOD

(71) Applicant: TOYOTA JIDOSHA KABUSHIKI KAISHA, Toyoto-shi, Aichi-ken (JP)

(72) Inventor: Makoto Kawaharada, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/843,088

(22) Filed: Dec. 15, 2017

(65) Prior Publication Data
US 2018/0178792 A1    Jun. 28, 2018

(30) Foreign Application Priority Data
Dec. 26, 2016 (JP) ................................. 2016-251660

(51) Int. Cl.
*B60W 30/16* (2012.01)
*B60W 40/04* (2006.01)

(52) U.S. Cl.
CPC ............ *B60W 30/16* (2013.01); *B60W 40/04* (2013.01); *B60W 2520/10* (2013.01); *B60W 2550/30* (2013.01); *B60W 2550/408* (2013.01); *B60W 2750/30* (2013.01); *B60W 2750/40* (2013.01)

(58) Field of Classification Search
USPC ........................................................ 701/119
See application file for complete search history.

(56) References Cited

U.S. PATENT DOCUMENTS

| | | | | |
|---|---|---|---|---|
| 6,397,149 | B1 * | 5/2002 | Hashimoto | G05D 1/0297 455/99 |
| 2013/0124012 | A1 * | 5/2013 | Shida | G08G 1/0104 701/2 |
| 2013/0138320 | A1 * | 5/2013 | Aso | B60W 30/16 701/96 |
| 2017/0263125 | A1 * | 9/2017 | Tanabe | G08G 1/161 |
| 2018/0178792 | A1 * | 6/2018 | Kawaharada | B60W 30/16 |

FOREIGN PATENT DOCUMENTS

JP    2008-046820 A    2/2008

* cited by examiner

*Primary Examiner* — Tyler D Paige
(74) *Attorney, Agent, or Firm* — Sughrue Mion, PLLC (57) ABSTRACT

A vehicle identification device includes an external sensor configured to detect a situation around a host vehicle, a vehicle speed sensor configured to detect a speed of the host vehicle, a communication unit configured to perform vehicle-to-vehicle communication with non-host vehicles, and an electronic control device. The electronic control device is configured to: acquire non-host vehicle detection information, acquire non-host vehicle communication information, identify a preceding vehicle, determine whether or not the in-vehicle sensor has lost the preceding vehicle, recognize the vehicle speed of the host vehicle, calculate an estimated relative distance between the lost preceding vehicle and the host vehicle when the preceding vehicle has been lost, and re-identify a communication continuation vehicle that used to be the preceding vehicle.

8 Claims, 5 Drawing Sheets

VEHICLE IDENTIFICATION DEVICE AND VEHICLE IDENTIFICATION METHOD

INCORPORATION BY REFERENCE

The disclosure of Japanese Patent Application No. 2016-251660 filed on Dec. 26, 2016 including the specification, drawings and abstract is incorporated herein by reference in its entirety.

BACKGROUND

1. Technical Field

The present disclosure relates to a vehicle identification device and a vehicle identification method.

2. Description of Related Art

In the related art, Japanese Unexamined Patent Application Publication No. 2008-46820 (JP 2008-46820 A) is known as technical literature relating to the identification of a plurality of non-host vehicles around a host vehicle. In the operation management system that is disclosed in JP 2008-46820 A regarding the traveling of a plurality of vehicles in line, in-line traveling based on vehicle-to-vehicle communication is performed in a case where a preceding vehicle traveling in front of the host vehicle belongs to the same vehicle group and following traveling based on an in-vehicle sensor of the host vehicle is performed in a case where the preceding vehicle traveling in front of the host vehicle does not belong to the same vehicle group.

SUMMARY

In the operation management system described above, the preceding vehicle traveling in front of the host vehicle needs to be identified from the non-host vehicles in vehicle-to-vehicle communication with the host vehicle. The identification of the preceding vehicle is performed by, for example, the collation of non-host vehicle communication information acquired by the vehicle-to-vehicle communication (such as information on the vehicle speed of the non-host vehicle recognized by the non-host vehicle) and preceding vehicle detection information acquired from a detection result of the in-vehicle sensor (such as information on the vehicle speed of the non-host vehicle detected by the in-vehicle sensor).

Once the detection by the in-vehicle sensor is hindered by an interrupting vehicle between the host vehicle and the preceding vehicle, however, the identifying of the preceding vehicle may be canceled, despite the continuation of the vehicle-to-vehicle communication, by the preceding vehicle being lost. In this case, a problem arises as much time is taken for the non-host vehicle that used to be a preceding vehicle to be re-identified from the collation of the non-host vehicle communication information acquired by the vehicle-to-vehicle communication and the non-host vehicle detection information acquired from the detection result of the in-vehicle sensor.

In this technical field, a vehicle identification device that is capable of performing re-identification within a shorter period of time than by the method according to the related art in a case where a preceding vehicle has been lost with vehicle-to-vehicle communication continuing has been in demand in this regard.

A first aspect of the present disclosure relates to a vehicle identification device including an external sensor configured to detect a situation around a host vehicle, a vehicle speed sensor configured to detect a speed of the host vehicle, a communication unit configured to perform vehicle-to-vehicle communication with non-host vehicles, and an electronic control device. The electronic control device is configured to receive a detection result from the external sensor and acquire non-host vehicle detection information including a relative vehicle speed of the non-host vehicle with respect to the host vehicle and a relative distance between the host vehicle and the non-host vehicle based on the detection result, acquire non-host vehicle communication information including a vehicle speed of the non-host vehicle around the host vehicle by the vehicle-to-vehicle communication performed by the communication unit, identify a preceding vehicle traveling directly in front of the host vehicle from the non-host vehicles in vehicle-to-vehicle communication with the host vehicle based on the acquired non-host vehicle detection information and the acquired non-host vehicle communication information, determine whether the external sensor has lost the preceding vehicle in a state where the vehicle-to-vehicle communication between the host vehicle and the preceding vehicle continues, recognize the vehicle speed of the host vehicle based on vehicle speed information detected by the vehicle speed sensor, calculate, in a case where the electronic control device determines that the preceding vehicle has been lost, an estimated relative distance between the lost preceding vehicle and the host vehicle based on the relative distance between the preceding vehicle and the host vehicle according to the non-host vehicle detection information immediately before the preceding vehicle has been lost, a vehicle speed of the preceding vehicle acquired by the continuing vehicle-to-vehicle communication, and the recognized vehicle speed of the host vehicle, and re-identify a communication continuation vehicle that used to be the preceding vehicle based on the estimated relative distance and the relative distance between the non-host vehicle and the host vehicle according to the non-host vehicle detection information.

The vehicle identification device according to the first aspect of the present disclosure calculates the estimated relative distance between the lost preceding vehicle and the host vehicle and re-identifies the communication continuation vehicle that used to be a preceding vehicle based on the estimated relative distance and the relative distance between the host vehicle and the non-host vehicle according to the non-host vehicle detection information in a case where the preceding vehicle has been lost with the vehicle-to-vehicle communication continuing, and thus the vehicle identification device according to the first aspect of the present disclosure is capable of performing the re-identification within a shorter period of time than in a case where the communication continuation vehicle is identified by the method according to the related art.

A second aspect of the present disclosure relates to a vehicle identification method using a vehicle identification device including an electronic control device, an external sensor configured to detect a situation around a host vehicle, a vehicle speed sensor configured to detect a speed of the host vehicle, and a communication unit configured to perform vehicle-to-vehicle communication with non-host vehicles. The method includes receiving a detection result from the external sensor and acquiring non-host vehicle detection information including a relative vehicle speed of the non-host vehicle with respect to the host vehicle and a relative distance between the host vehicle and the non-host vehicle based on the detection result, acquiring non-host vehicle communication information including a vehicle speed of the non-host vehicle around the host vehicle by the vehicle-to-vehicle communication performed by the communication unit, identifying a preceding vehicle traveling directly in front of the host vehicle from the non-host vehicles in vehicle-to-vehicle communication with the host vehicle based on the acquired non-host vehicle detection information and the acquired non-host vehicle communication information, determining whether or not the external sensor has lost the preceding vehicle in a state where the vehicle-to-vehicle communication between the host vehicle and the preceding vehicle continues, recognizing the vehicle speed of the host vehicle based on vehicle speed information detected by the vehicle speed sensor, calculating, in a case where the electronic control device determines that the preceding vehicle has been lost, an estimated relative distance between the lost preceding vehicle and the host vehicle based on the relative distance between the preceding vehicle and the host vehicle according to the non-host vehicle detection information immediately before the preceding vehicle has been lost, a vehicle speed of the preceding vehicle acquired by the continuing vehicle-to-vehicle communication, and the recognized vehicle speed of the host vehicle, and re-identifying a communication continuation vehicle that used to be the preceding vehicle based on the estimated relative distance and the relative distance between the non-host vehicle and the host vehicle according to the non-host vehicle detection information.

According to the aspects of the present disclosure, the re-identification can be performed within a shorter period of time than by the method according to the related art as described above in a case where the preceding vehicle has been lost with the vehicle-to-vehicle communication continuing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure will be described with reference to accompanying drawings.

Figure 1:
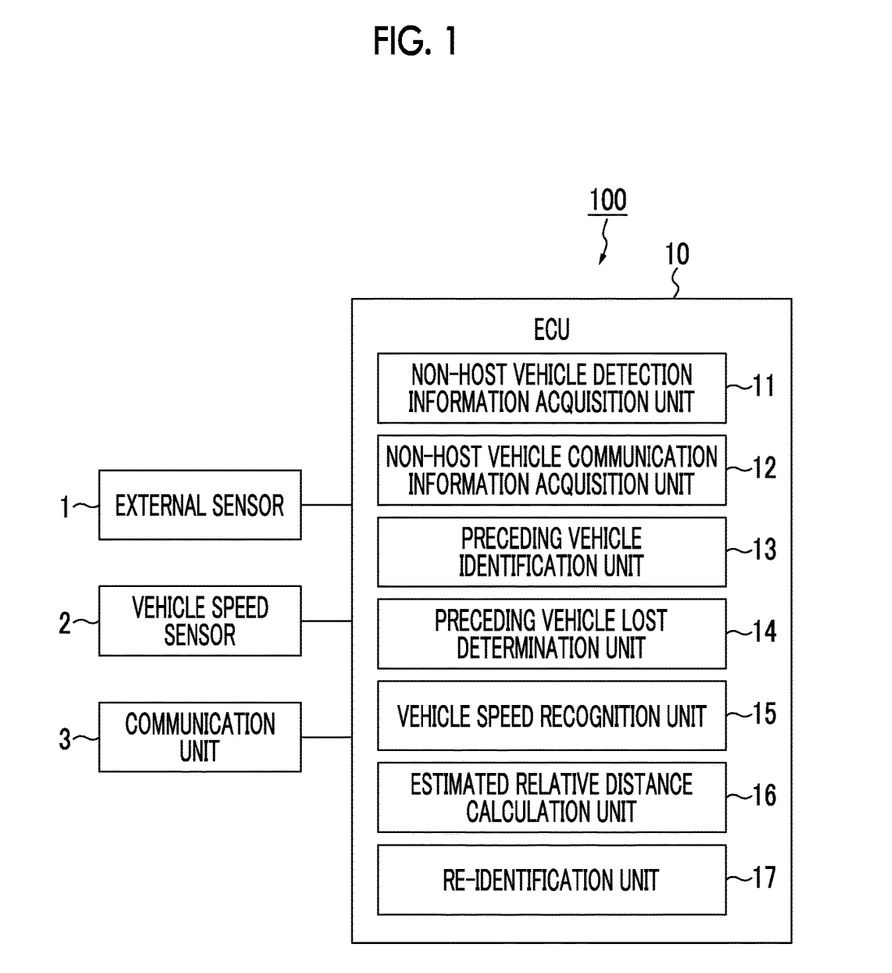
FIG. 1 is a block diagram illustrating a vehicle identification device according to an embodiment.

FIG. 1 is a block diagram illustrating a vehicle identification device according to the embodiment. A vehicle identification device 100 illustrated in FIG. 1 is mounted in a vehicle (host vehicle) such as a passenger vehicle and identifies a non-host vehicle around the host vehicle. The identification of the non-host vehicle means identification of the fact that the non-host vehicle in vehicle-to-vehicle communication and the non-host vehicle detected by an in-vehicle sensor of the host vehicle are the same vehicle. The result of the identification of the non-host vehicle by the vehicle identification device 100 is used in, for example, an autonomous driving system, a driving assistance system, and a cooperative adaptive cruise control (CACC) system.

Configuration of Vehicle Identification Device

A configuration of the vehicle identification device 100 will be described below. As illustrated in FIG. 1, the vehicle identification device 100 is provided with an electronic control unit (ECU) 10 performing comprehensive system management. The ECU 10 is an electronic control unit that has a central processing unit (CPU), a read-only memory (ROM), a random access memory (RAM), a controller area network (CAN) communication circuit, and so on. Various functions are realized in the ECU 10 by, for example, a program stored in the ROM being loaded in the RAM and the program loaded in the RAM being executed by the CPU. A plurality of electronic units may constitute the ECU 10. An external sensor 1, a vehicle speed sensor 2, and a communication unit 3 are connected to the ECU 10.

The external sensor 1 is a detection instrument detecting a situation around the host vehicle. The external sensor 1 includes at least one of a camera and a radar sensor.

The camera is an imaging instrument imaging an external situation regarding the host vehicle. The camera is disposed on the back side of the windshield of the host vehicle. The camera transmits imaging information relating to the external situation regarding the host vehicle to the ECU 10. The camera may be a monocular camera or a stereo camera. The stereo camera has two imaging units disposed to reproduce binocular parallax. The imaging information of the stereo camera also includes information on the depth direction of a captured image (distance information). The monocular camera is also capable of obtaining information on the depth direction of a captured image by using a known technique.

The radar sensor is a detection instrument detecting obstacles around the host vehicle by using radio waves (such as millimeter waves) or light. The radar sensor includes, for example, a millimeter wave radar or a light detection and ranging (LIDAR). The radar sensor detects the obstacles by transmitting the radio waves or the light around the host vehicle and receiving the radio waves or the light reflected by the obstacles. The radar sensor transmits information on the detected obstacles to the ECU 10. The obstacles include moving obstacles such as a pedestrian, a bicycle, and the non-host vehicle as well as fixed obstacles such as a guardrail and a building. The external sensor 1 corresponds to the in-vehicle sensor described above.

The vehicle speed sensor 2 is a detector detecting the speed of the host vehicle. A vehicle wheel speed sensor is used as an example of the vehicle speed sensor 2. The vehicle wheel speed sensor is disposed with respect to a vehicle wheel of the host vehicle, a drive shaft rotating integrally with the vehicle wheel, or the like and detects the rotation speed of the vehicle wheel. The vehicle speed sensor 2 transmits information on the detected vehicle speed (vehicle wheel speed information) to the ECU 10.

The communication unit 3 is an instrument configured to perform vehicle-to-vehicle communication with the non-host vehicle. The communication unit 3 acquires various types of information from the non-host vehicle around the host vehicle by performing the vehicle-to-vehicle communication. The communication unit 3 may be capable of performing road-to-vehicle communication and communication based on a wireless network (such as the Internet and a vehicle information and communication system).

Hereinafter, a functional configuration of the ECU 10 will be described. The ECU 10 has a non-host vehicle detection information acquisition unit 11, a non-host vehicle communication information acquisition unit 12, a preceding vehicle identification unit 13, a preceding vehicle lost determination unit 14, a vehicle speed recognition unit 15, an estimated relative distance calculation unit 16, and a re-identification unit 17.

The non-host vehicle detection information acquisition unit 11 acquires non-host vehicle detection information relating to the non-host vehicle around the host vehicle based on the detection result of the external sensor 1. The non-host vehicle detection information is information on the non-host vehicle obtained from the detection result of the external sensor 1 of the host vehicle. The non-host vehicle detection information includes at least the relative vehicle speed of the non-host vehicle with respect to the host vehicle and the relative distance between the host vehicle and the non-host vehicle. The non-host vehicle detection information may also include the direction of the non-host vehicle with respect to the host vehicle, the acceleration of the non-host vehicle, the traveling direction of the non-host vehicle, and so on.

The non-host vehicle communication information acquisition unit 12 acquires non-host vehicle communication information by the vehicle-to-vehicle communication with the non-host vehicle that is performed by the communication unit 3. The non-host vehicle communication information is information on the non-host vehicle that the non-host vehicle recognizes from an in-vehicle sensor of the non-host vehicle or the like. The non-host vehicle communication information includes at least the vehicle speed of the non-host vehicle (vehicle speed recognized by the non-host vehicle itself). The non-host vehicle communication information may also include the acceleration of the non-host vehicle and the yaw rate of the non-host vehicle. The non-host vehicle communication information acquisition unit 12 distinguishes the non-host vehicle by using an individual ID given to the received information.

The preceding vehicle identification unit 13 identifies a preceding vehicle from the non-host vehicles in vehicle-to-vehicle communication with the host vehicle. The preceding vehicle is the non-host vehicle traveling directly in front of the host vehicle in the same traveling lane as the host vehicle. The preceding vehicle identification unit 13 identifies the preceding vehicle based on the non-host vehicle detection information acquired by the non-host vehicle detection information acquisition unit 11 and the non-host vehicle communication information acquired by the non-host vehicle communication information acquisition unit 12.

The preceding vehicle identification unit 13 recognizes information on the preceding vehicle traveling directly in front of the host vehicle based on the non-host vehicle detection information and recognizes information on the non-host vehicle in vehicle-to-vehicle communication with the host vehicle based on the non-host vehicle communication information. The preceding vehicle identification unit 13 collates the recognized information on the preceding vehicle and the information on the non-host vehicle in vehicle-to-vehicle communication. For example, the preceding vehicle identification unit 13 collates a time change in the vehicle speed of the preceding vehicle and a time change in the vehicle speed of the non-host vehicle in vehicle-to-vehicle communication in a certain period of time. In a case where a non-host vehicle showing the time change in the vehicle speed of the preceding vehicle and the time change in the vehicle speed obtained from the vehicle-to-vehicle communication in the certain period of time corresponding to each other is present, the preceding vehicle identification unit 13 identifies the non-host vehicle in vehicle-to-vehicle communication as the preceding vehicle.

The preceding vehicle identification unit 13 does not necessarily have to seek perfect matching. The preceding vehicle identification unit 13 may determine that the time change in the vehicle speed of the preceding vehicle and the time change in the vehicle speed of the non-host vehicle in vehicle-to-vehicle communication in the certain period of time correspond to each other in a case where the difference between the time change in the vehicle speed of the preceding vehicle and the time change in the vehicle speed of the non-host vehicle in vehicle-to-vehicle communication in the certain period of time is within a predetermined range. Alternatively, the preceding vehicle identification unit 13 may identify the preceding vehicle from the non-host vehicles in vehicle-to-vehicle communication by a known method based on the result of the collation between the information on the preceding vehicle that is recognized from the non-host vehicle detection information and the information on the non-host vehicle in vehicle-to-vehicle communication. The preceding vehicle identification unit 13 may also perform the identification of the preceding vehicle based on a time change in the relative distance between the host vehicle and the non-host vehicle.

The preceding vehicle lost determination unit 14 determines whether or not the external sensor (in-vehicle sensor) 1 has lost the preceding vehicle in a state where the vehicle-to-vehicle communication between the preceding vehicle and the host vehicle continues. The preceding vehicle lost determination unit 14 makes the determination based on the non-host vehicle detection information and the non-host vehicle communication information. The external sensor 1 losing the preceding vehicle means the external sensor 1 becoming incapable of detecting the preceding vehicle.

Figure 2A:
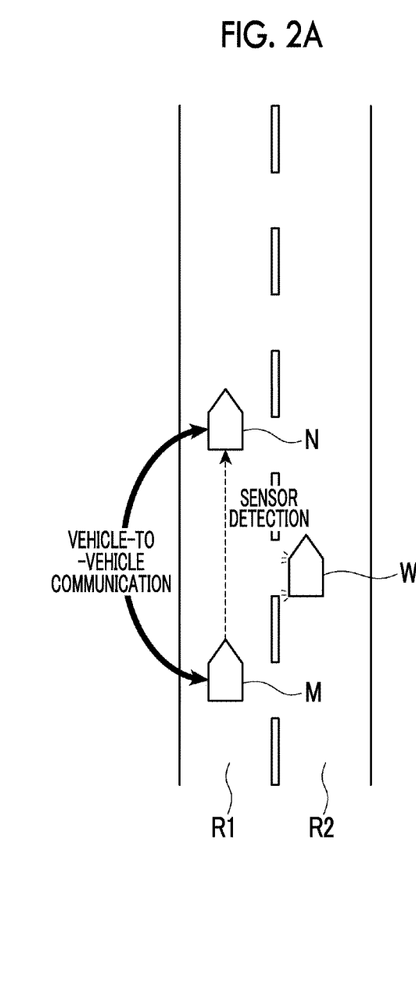
FIG. 2A is a plan view illustrating a preceding vehicle identification situation.

FIG. 2A is a plan view illustrating a preceding vehicle identification situation. A host vehicle M, a traveling lane R1 in which the host vehicle M travels, an adjacent lane R2 adjacent to the traveling lane R1, a preceding vehicle N, and an interrupting vehicle W are illustrated in FIG. 2A. The preceding vehicle N is a non-host vehicle traveling directly in front of the host vehicle M in the traveling lane R1. The interrupting vehicle W is a non-host vehicle planning to change lanes in the adjacent lane R2 to travel between the host vehicle M and the preceding vehicle N.

In the situation that is illustrated in FIG. 2A, the host vehicle M and the preceding vehicle N perform vehicle-to-vehicle communication with each other and the external sensor 1 of the host vehicle M detects the preceding vehicle N. In the situation that is illustrated in FIG. 2A, the preceding vehicle identification unit 13 identifies the preceding vehicle N in vehicle-to-vehicle communication.

Figure 2B:
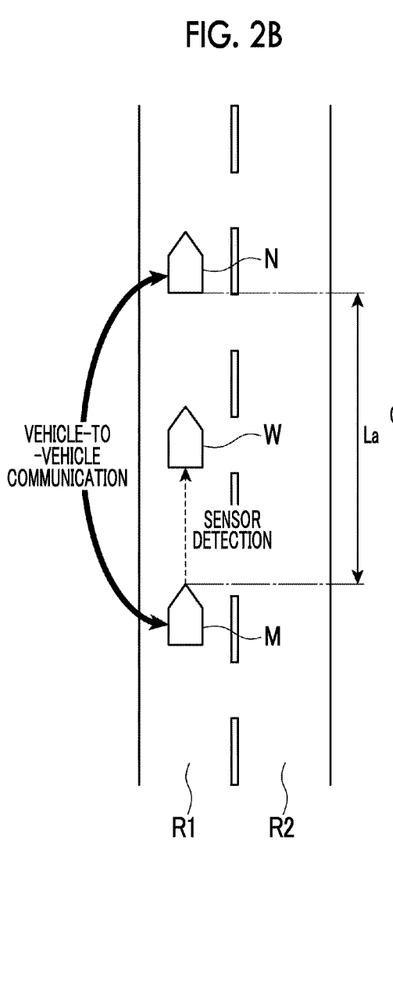
FIG. 2B is a plan view illustrating a situation in which a preceding vehicle has been lost because of an interrupting vehicle.

FIG. 2B is a plan view illustrating a situation in which the preceding vehicle N has been lost because of the interrupting vehicle W. A relative distance La between the preceding vehicle N and the host vehicle M immediately before the preceding vehicle N has been lost is illustrated in FIG. 2B. As illustrated in FIG. 2B, the external sensor 1 temporarily loses the preceding vehicle N once the interrupting vehicle W begins to travel between the host vehicle M and the preceding vehicle N and the detection range of the external sensor 1 of the host vehicle M is obstructed by the interrupting vehicle W. In the situation that is illustrated in FIG. 2B, the preceding vehicle lost determination unit 14 determines that the external sensor 1 has lost the preceding vehicle N with the vehicle-to-vehicle communication between the preceding vehicle N and the host vehicle M continuing.

The vehicle speed recognition unit 15 recognizes the vehicle speed of the host vehicle M based on the detection result of the vehicle speed sensor 2. The vehicle speed recognition unit 15 recognizes the vehicle speed of the host vehicle M at regular intervals.

In a case where the preceding vehicle lost determination unit 14 determines that the external sensor 1 has lost the preceding vehicle N with the vehicle-to-vehicle communication continuing, the estimated relative distance calculation unit 16 calculates an estimated relative distance between the lost preceding vehicle N and the host vehicle M. The estimated relative distance is an estimated value of the relative distance between the preceding vehicle N and the host vehicle M at the present point in time. The estimated relative distance calculation unit 16 calculates the estimated relative distance between the preceding vehicle N and the host vehicle M based on the relative distance between the preceding vehicle N and the host vehicle M according to the non-host vehicle detection information immediately before the preceding vehicle N has been lost, the vehicle speed of the preceding vehicle N acquired by the continuing vehicle-to-vehicle communication, and the vehicle speed of the host vehicle M recognized by the vehicle speed recognition unit 15. Immediately before the preceding vehicle N has been lost means, for example, the point in time immediately before the preceding vehicle lost determination unit 14 determines that the preceding vehicle N has been lost. The non-host vehicle communication information acquisition unit 12 continues to acquire the vehicle speed of the preceding vehicle N (lost preceding vehicle N) to which the individual ID is given by the vehicle-to-vehicle communication.

Figure 2C:
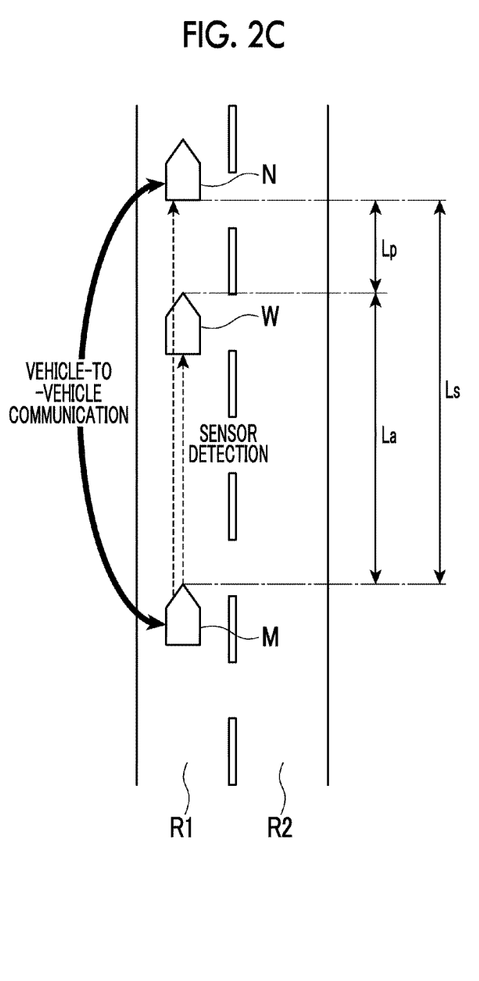
FIG. 2C is a plan view illustrating a situation in which re-identification of a communication continuation vehicle that used to be a preceding vehicle is performed.

FIG. 2C is a plan view illustrating a situation in which the calculation of the estimated relative distance between the preceding vehicle N and the host vehicle M is performed. The relative distance La between the preceding vehicle N and the host vehicle M immediately before the preceding vehicle N has been lost, the amount Lp of change in the relative distance between the preceding vehicle N and the host vehicle M after the preceding vehicle N has been lost, and a relative distance Ls between the preceding vehicle N and the host vehicle M at the present point in time are illustrated in FIG. 2C.

The estimated relative distance calculation unit 16 recognizes the relative distance La between the preceding vehicle N and the host vehicle M immediately before the preceding vehicle N has been lost from the non-host vehicle detection information immediately before the preceding vehicle N has been lost. The estimated relative distance calculation unit 16 recognizes the amount Lp of change in the relative distance between the preceding vehicle N and the host vehicle M after the preceding vehicle N has been lost from the vehicle speed of the host vehicle M and the vehicle speed of the preceding vehicle N acquired by the continuing vehicle-to-vehicle communication.

As illustrated in FIGS. 2C, the relative distance Ls between the preceding vehicle N and the host vehicle M at the present point in time corresponds to the sum of the relative distance La between the preceding vehicle N and the host vehicle M immediately before the preceding vehicle N has been lost and the amount Lp of change in the relative distance between the preceding vehicle N and the host vehicle M after the preceding vehicle N has been lost. In this regard, the estimated relative distance calculation unit 16 calculates the sum of the relative distance La between the preceding vehicle N and the host vehicle M immediately before the preceding vehicle N has been lost and the amount Lp of change in the relative distance between the preceding vehicle N and the host vehicle M after the preceding vehicle N has been lost as the estimated relative distance.

The re-identification unit 17 performs re-identification of the lost preceding vehicle N based on the non-host vehicle detection information acquired by the non-host vehicle detection information acquisition unit 11, the non-host vehicle communication information acquired by the non-host vehicle communication information acquisition unit 12, and the estimated relative distance calculated by the estimated relative distance calculation unit 16.

In the situations that are illustrated in FIGS. 2B and 2C, the interrupting vehicle W becomes a new preceding vehicle traveling directly in front of the host vehicle M as the interrupting vehicle W begins to travel between the preceding vehicle N and the host vehicle M. Accordingly, in the following description, the lost preceding vehicle N will be referred to as a communication continuation vehicle N. The re-identification unit 17 re-identifies the communication continuation vehicle N that used to be a preceding vehicle from the non-host vehicles detected by the external sensor 1.

The re-identification will be described below with reference to FIG. 2C. In the situation that is illustrated in FIG. 2C, the communication continuation vehicle N is detected by the external sensor 1 of the host vehicle M. In other words, the non-host vehicle detection information acquisition unit 11 acquires the non-host vehicle detection information that includes information on the communication continuation vehicle N. In the above-described situation, the re-identification unit 17 compares the relative distance between the host vehicle M and the non-host vehicle included in the non-host vehicle detection information acquired by the non-host vehicle detection information acquisition unit 11 (whether the non-host vehicle is the communication continuation vehicle N being unclear) and the estimated relative distance calculated by the estimated relative distance calculation unit 16 to each other.

The re-identification unit 17 determines whether or not a non-host vehicle in which the absolute value of the difference between the estimated relative distance and the relative distance from the host vehicle M is equal to or less than a distance threshold is present. The distance threshold is a set value (such as 1 m) set in advance. In a case where the non-host vehicle in which the absolute value of the difference between the estimated relative distance and the relative distance from the host vehicle M is equal to or less than the distance threshold is present, the re-identification unit 17 identifies the non-host vehicle as a candidate vehicle for the communication continuation vehicle N (that is, the lost preceding vehicle N).

In a case where the candidate vehicle for the communication continuation vehicle N is identified, the re-identification unit 17 recognizes the vehicle speed of the candidate vehicle for the communication continuation vehicle N based on the vehicle speed of the host vehicle M and the relative vehicle speed of the candidate vehicle for the communication continuation vehicle N according to the non-host vehicle detection information (relative vehicle speed of the candidate vehicle for the communication continuation vehicle N with respect to the host vehicle M). The re-identification unit 17 compares the vehicle speed of the candidate vehicle for the communication continuation vehicle N and the vehicle speed of the communication continuation vehicle N continuing to perform vehicle-to-vehicle communication to each other. In a case where the absolute value of the difference between the vehicle speed of the candidate vehicle for the communication continuation vehicle N and the vehicle speed of the communication continuation vehicle N continuing to perform the vehicle-to-vehicle communication is equal to or less than a speed threshold, the re-identification unit 17 re-identifies the non-host vehicle as the communication continuation vehicle N. The speed threshold is a set value (such as 5 km/h) set in advance.

When the absolute value of the difference between the vehicle speed of the candidate vehicle for the communication continuation vehicle N and the vehicle speed of the communication continuation vehicle N continuing to perform the vehicle-to-vehicle communication exceeds the speed threshold, the re-identification unit 17 does not re-identify the candidate vehicle as the communication continuation vehicle N.

The re-identification unit 17 considers stopping the re-identification in a case where the preceding vehicle lost determination unit 14 determines that the external sensor 1 has lost the communication continuation vehicle (preceding vehicle) N with the vehicle-to-vehicle communication continuing.

Specifically, the re-identification unit 17 recognizes the traveling distance of the host vehicle M after the preceding vehicle N has been lost based on the vehicle speed of the host vehicle M and recognizes the traveling distance of the communication continuation vehicle N after the preceding vehicle N has been lost based on the vehicle speed of the communication continuation vehicle N continuing to perform the vehicle-to-vehicle communication. The re-identification unit 17 determines whether or not the sum of the traveling distance of the communication continuation vehicle N and the traveling distance of the host vehicle M after the preceding vehicle N has been lost is equal to or greater than a re-identification stop threshold. The re-identification stop threshold is a set value set in advance. The re-identification unit 17 stops the re-identification in a case where the sum of the traveling distance of the communication continuation vehicle N and the traveling distance of the host vehicle M after the preceding vehicle N has been lost is equal to or greater than the re-identification stop threshold.

The re-identification unit 17 stops the re-identification in a case where the sum of the traveling distance of the communication continuation vehicle N and the traveling distance of the host vehicle M after the preceding vehicle N has been lost is equal to or greater than the re-identification stop threshold because the possibility to re-identify another non-host vehicle as the communication continuation vehicle N increases as the traveling distances of the host vehicle M and the communication continuation vehicle N increase after the preceding vehicle N has been lost.

Processing Performed by Vehicle Identification Device

Hereinafter, processing performed by the vehicle identification device 100 will be described with reference to accompanying drawings.

Preceding Vehicle Identification Processing

Figure 3:
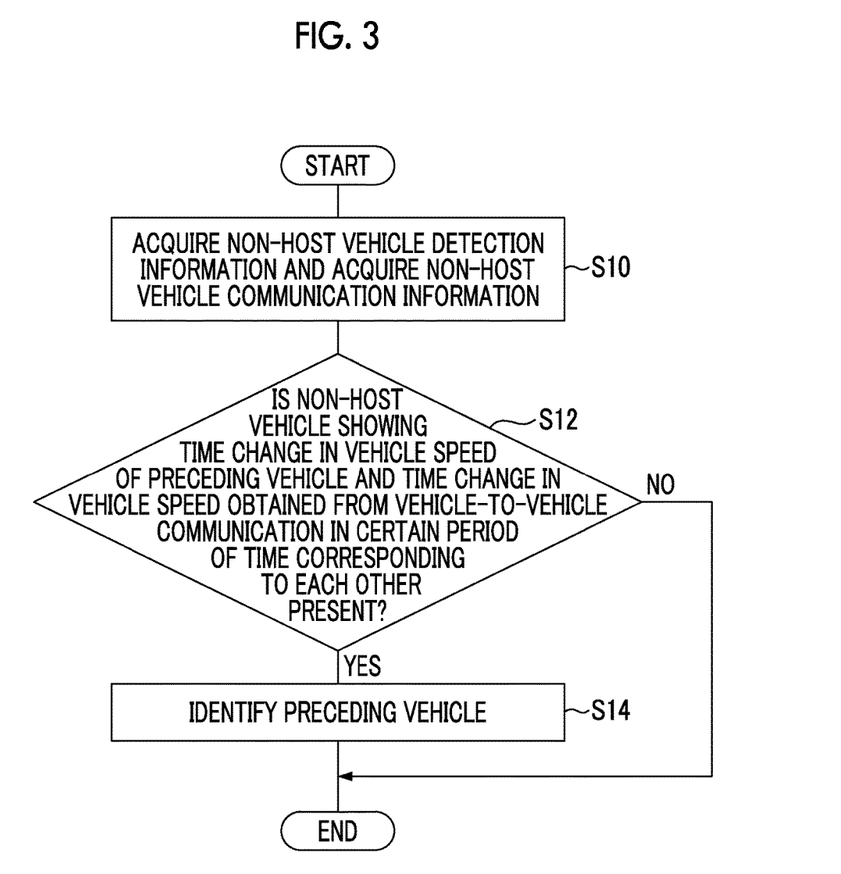
FIG. 3 is a flowchart illustrating preceding vehicle identification processing.

FIG. 3 is a flowchart illustrating preceding vehicle identification processing. The flowchart that is illustrated in FIG. 3 is executed in a case where, for example, the preceding vehicle N is not identified with the host vehicle M performing vehicle-to-vehicle communication with a non-host vehicle.

As illustrated in FIG. 3, the ECU 10 of the vehicle identification device 100 performs the acquisition of the non-host vehicle detection information by the non-host vehicle detection information acquisition unit 11 and the acquisition of the non-host vehicle communication information by the non-host vehicle communication information acquisition unit 12 in S10. The non-host vehicle detection information acquisition unit 11 acquires the non-host vehicle detection information relating to the non-host vehicle around the host vehicle M based on the detection result of the external sensor 1. The non-host vehicle communication information acquisition unit 12 acquires the non-host vehicle communication information by the communication unit 3 performing vehicle-to-vehicle communication with the non-host vehicle.

In S12, the preceding vehicle identification unit 13 of the ECU 10 determines whether or not a non-host vehicle showing a time change in the vehicle speed of the preceding vehicle N and a time change in the vehicle speed obtained from the vehicle-to-vehicle communication in a certain period of time corresponding to each other is present. The preceding vehicle identification unit 13 recognizes the time change in the vehicle speed of the preceding vehicle N traveling directly in front of the host vehicle M based on the non-host vehicle detection information and recognizes the time change in the vehicle speed of the non-host vehicle in vehicle-to-vehicle communication with the host vehicle M based on the non-host vehicle communication information. The preceding vehicle identification unit 13 makes the determination by collating the recognized time change in the vehicle speed of the preceding vehicle N and the recognized time change in the vehicle speed of the non-host vehicle in vehicle-to-vehicle communication.

The ECU 10 terminates the current preceding vehicle identification processing in a case where the ECU 10 does not determine that the non-host vehicle showing the time change in the vehicle speed of the preceding vehicle N and the time change in the vehicle speed obtained from the vehicle-to-vehicle communication in the certain period of time corresponding to each other is present (S12: NO). Then, the ECU 10 repeats the processing from S10 again after the elapse of the certain period of time. The ECU 10 allows the processing to proceed to S14 in a case where the ECU 10 determines that the non-host vehicle showing the time change in the vehicle speed of the preceding vehicle and the time change in the vehicle speed obtained from the vehicle-to-vehicle communication in the certain period of time corresponding to each other is present (S12: YES).

In S14, the preceding vehicle identification unit 13 of the ECU 10 identifies the preceding vehicle N from the non-host vehicles in vehicle-to-vehicle communication with the host vehicle M. The preceding vehicle identification unit 13 identifies the non-host vehicle showing the time change in the vehicle speed of the preceding vehicle N and the time change in the vehicle speed obtained from the vehicle-to-vehicle communication in the certain period of time corresponding to each other as the preceding vehicle N. Then, the ECU 10 terminates the current preceding vehicle identification processing.

Re-Identification Processing

Figure 4:
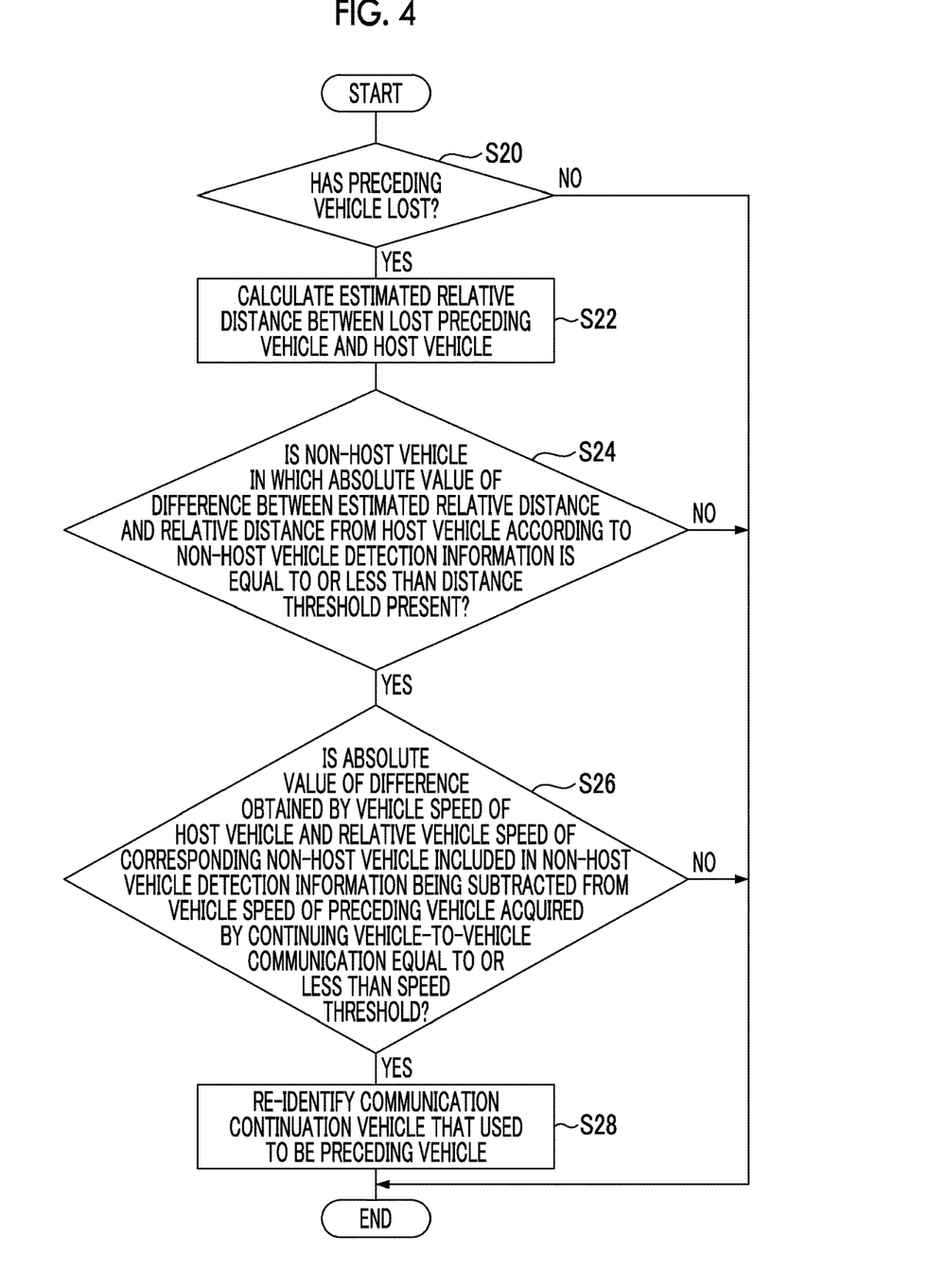
FIG. 4 is a flowchart illustrating re-identification processing.

FIG. 4 is a flowchart illustrating re-identification processing. The flowchart that is illustrated in FIG. 4 is executed in a case where the preceding vehicle is identified in S14 of FIG. 3.

As illustrated in FIG. 4, the preceding vehicle lost determination unit 14 of the ECU 10 determines in S20 whether or not the external sensor 1 has lost the preceding vehicle N with the vehicle-to-vehicle communication between the preceding vehicle N and the host vehicle M continuing. The preceding vehicle lost determination unit 14 makes the determination based on the non-host vehicle detection information and the non-host vehicle communication information.

The ECU 10 terminates the current re-identification processing in a case where the ECU 10 does not determine that the external sensor 1 has lost the preceding vehicle N with the vehicle-to-vehicle communication between the preceding vehicle N and the host vehicle M continuing (S20: NO). Then, the ECU 10 repeats the processing from S20 again after the elapse of a certain period of time. The ECU 10 allows the processing to proceed to S22 in a case where the ECU 10 determines that the external sensor 1 has lost the preceding vehicle N with the vehicle-to-vehicle communication between the preceding vehicle N and the host vehicle M continuing (S20: YES).

In S22, the estimated relative distance calculation unit 16 of the ECU 10 calculates the estimated relative distance between the lost preceding vehicle N and the host vehicle M. The estimated relative distance calculation unit 16 calculates the estimated relative distance between the preceding vehicle N and the host vehicle M based on the vehicle speed of the host vehicle M recognized by the vehicle speed recognition unit 15 and the non-host vehicle detection information immediately before the preceding vehicle N has been lost.

In S24, the re-identification unit 17 of the ECU 10 determines whether or not a non-host vehicle in which the absolute value of the difference between the estimated relative distance and the relative distance from the host vehicle M is equal to or less than the distance threshold is present. The re-identification unit 17 makes the determination by comparing the relative distance between the host vehicle M and the non-host vehicle included in the non-host vehicle detection information acquired by the non-host vehicle detection information acquisition unit 11 and the estimated relative distance calculated by the estimated relative distance calculation unit 16 to each other. The ECU 10 terminates the current re-identification processing in a case where the ECU 10 does not determine that the non-host vehicle in which the absolute value of the difference between the estimated relative distance and the relative distance from the host vehicle M is equal to or less than the distance threshold is present (S24: NO). Then, the ECU 10 repeats the processing from S20 again after the elapse of a certain period of time. In a case where the ECU 10 determines that the non-host vehicle in which the absolute value of the difference between the estimated relative distance and the relative distance from the host vehicle M is equal to or less than the distance threshold is present (S24: YES), the ECU 10 identifies the non-host vehicle as the candidate vehicle for the communication continuation vehicle N that used to be a preceding vehicle. Then, the ECU 10 allows the processing to proceed to S26.

In S26, the re-identification unit 17 of the ECU 10 determines whether or not the absolute value of the difference between the vehicle speed of the candidate vehicle for the communication continuation vehicle N and the vehicle speed of the communication continuation vehicle N continuing to perform vehicle-to-vehicle communication is equal to or less than the speed threshold. The re-identification unit 17 recognizes the vehicle speed of the candidate vehicle for the communication continuation vehicle N based on the vehicle speed of the host vehicle M and the relative vehicle speed of the candidate vehicle for the communication continuation vehicle N according to the non-host vehicle detection information (relative vehicle speed of the candidate vehicle for the communication continuation vehicle N with respect to the host vehicle M). The re-identification unit 17 makes the determination by comparing the vehicle speed of the candidate vehicle for the communication continuation vehicle N and the vehicle speed of the communication continuation vehicle N continuing to perform the vehicle-to-vehicle communication to each other.

The ECU 10 terminates the current re-identification processing in a case where the ECU 10 does not determine that the absolute value of the difference between the vehicle speed of the candidate vehicle for the communication continuation vehicle N and the vehicle speed of the communication continuation vehicle N continuing to perform the vehicle-to-vehicle communication is equal to or less than the speed threshold (S26: NO). Then, the ECU 10 repeats the processing from S20 again after the elapse of a certain period of time. The ECU 10 allows the processing to proceed to S28 in a case where the ECU 10 determines that the absolute value of the difference between the vehicle speed of the candidate vehicle for the communication continuation vehicle N and the vehicle speed of the communication continuation vehicle N continuing to perform the vehicle-to-vehicle communication is equal to or less than the speed threshold (S26: YES).

In S28, the re-identification unit 17 of the ECU 10 identifies the candidate vehicle for the communication continuation vehicle N as the communication continuation vehicle N that used to be a preceding vehicle. Then, the ECU 10 terminates the current re-identification processing.

Re-Identification Stop Processing

Figure 5:
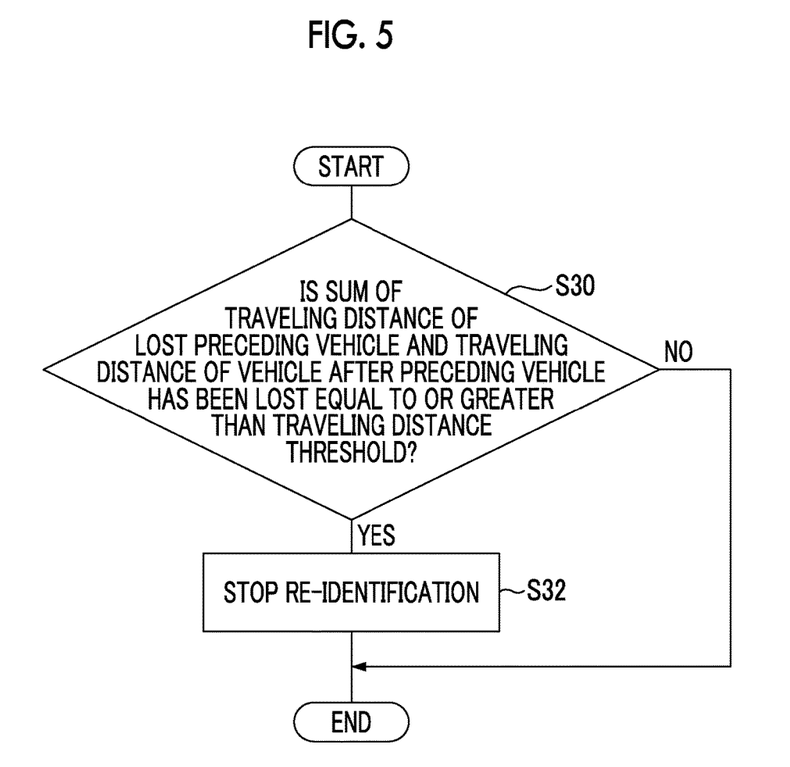
FIG. 5 is a flowchart illustrating re-identification stop processing.

FIG. 5 is a flowchart illustrating re-identification stop processing. The flowchart that is illustrated in FIG. 5 is executed in a case where the re-identification processing of FIG. 4 is initiated (that is, in a case where the preceding vehicle is identified in S14 of FIG. 3). In a case where the re-identification of the communication continuation vehicle N in S28 of FIG. 4 is performed, the re-identification stop processing is terminated even in the middle of the re-identification stop processing.

As illustrated in FIG. 5, the re-identification unit 17 of the ECU 10 determines in S30 whether or not the sum of the traveling distance of the communication continuation vehicle N and the traveling distance of the host vehicle M after the preceding vehicle N has been lost is equal to or greater than the re-identification stop threshold. The re-identification unit 17 recognizes the traveling distance of the host vehicle M after the preceding vehicle N has been lost based on the vehicle speed of the host vehicle M and recognizes the traveling distance of the communication continuation vehicle N after the preceding vehicle N has been lost based on the vehicle speed of the communication continuation vehicle N continuing to perform vehicle-to-vehicle communication. The re-identification unit 17 makes the determination by calculating the sum of the traveling distance of the communication continuation vehicle N and the traveling distance of the host vehicle M after the preceding vehicle N has been lost.

The ECU 10 terminates the current re-identification stop processing in a case where the ECU 10 does not determine that the sum of the traveling distance of the communication continuation vehicle N and the traveling distance of the host vehicle M after the preceding vehicle N has been lost is equal to or greater than the re-identification stop threshold (S30: NO). Then, the ECU 10 initiates the processing of S30 again after the elapse of a certain period of time. The ECU 10 allows the processing to proceed to S32 in a case where the ECU 10 determines that the sum of the traveling distance of the communication continuation vehicle N and the traveling distance of the host vehicle M after the preceding vehicle N has been lost is equal to or greater than the re-identification stop threshold (S30: YES).

In S32, the ECU 10 stops the re-identification. In other words, the ECU 10 stops the re-identification processing of FIG. 4. Then, the ECU 10 terminates the current re-identification stop processing.

Action and Effect of Vehicle Identification Device

The vehicle identification device 100 according to the embodiment described above calculates the estimated relative distance between the host vehicle M and the lost preceding vehicle (communication continuation vehicle) N and re-identifies the communication continuation vehicle N that used to be a preceding vehicle based on the estimated relative distance and the relative distance between the host vehicle M and the non-host vehicle according to the non-host vehicle detection information in a case where the preceding vehicle N has been lost with the vehicle-to-vehicle communication continuing, and thus the vehicle identification device 100 is capable of performing the re-identification within a shorter period of time than in a case where the communication continuation vehicle N is identified by the method according to the related art. Specifically, in a case where a non-host vehicle in which the difference from the estimated relative distance between the lost preceding vehicle N and the host vehicle M is a relative distance equal to or less than the distance threshold is present, the vehicle identification device 100 re-identifies the non-host vehicle as the communication continuation vehicle N, and thus the vehicle identification device 100 is capable of performing the re-identification within a shorter period of time than in a case where the communication continuation vehicle N is identified by the method according to the related art.

Even in a case where the non-host vehicle in which the difference from the estimated relative distance between the lost preceding vehicle N and the host vehicle M is the relative distance equal to or less than the distance threshold is present, the vehicle identification device 100 does not perform the re-identification when the absolute value of the difference obtained by the vehicle speed of the host vehicle M and the relative vehicle speed of the non-host vehicle included in the non-host vehicle detection information being subtracted from the vehicle speed of the communication continuation vehicle N acquired by the continuing vehicle-to-vehicle communication exceeds the speed threshold. As a result, the vehicle identification device 100 is capable of avoiding erroneous re-identification of a non-host vehicle other than the communication continuation vehicle N.

The vehicle identification device 100 stops the re-identification in a case where the sum of the traveling distance of the communication continuation vehicle N and the traveling distance of the host vehicle M after the preceding vehicle N has been lost is equal to or greater than the re-identification stop threshold because the possibility to erroneously re-identify another non-host vehicle increases as the traveling distances of the host vehicle M and the communication continuation vehicle N increase after the preceding vehicle N has been lost. Accordingly, the vehicle identification device 100 is capable of avoiding erroneous re-identification of a non-host vehicle other than the communication continuation vehicle N.

Although a preferred embodiment of the present disclosure has been described above, the present disclosure is not limited to the embodiment described above. The present disclosure can also be implemented in various modified and improved forms based on the knowledge of those skilled in the art and the embodiment described above.

In a case where a plurality of non-host vehicles in which the absolute value of the difference between the estimated relative distance and the relative distance from the host vehicle M is equal to or less than the distance threshold (such as 1 m) is present, the re-identification unit 17 may identify the non-host vehicle that has the smaller difference between the estimated relative distance and the relative distance from the host vehicle M among the non-host vehicles as the candidate for the communication continuation vehicle N.

The re-identification unit 17 may also determine whether or not a non-host vehicle in which a state where the absolute value of the difference between the estimated relative distance and the relative distance from the host vehicle M is equal to or less than the distance threshold continues for a certain period of time is present in order to enhance the reliability of the re-identification. The certain period of time is a set value set in advance. The re-identification unit 17 identifies the non-host vehicle as the candidate vehicle for the communication continuation vehicle N in a case where the non-host vehicle in which the state where the absolute value of the difference between the estimated relative distance and the relative distance from the host vehicle M is equal to or less than the distance threshold continues for the certain period of time is present.

The re-identification unit 17 may also determine whether or not a state where the absolute value of the difference between the vehicle speed of the candidate vehicle for the communication continuation vehicle N and the vehicle speed of the communication continuation vehicle N continuing to perform vehicle-to-vehicle communication is equal to or less than the speed threshold continues for a certain period of time in order to enhance the reliability of the re-identification. The certain period of time is a set value set in advance. The certain period of time may be equal to or different from the certain period of time relating to the determination of the distance threshold. The re-identification unit 17 re-identifies the candidate vehicle for the communication continuation vehicle N as the communication continuation vehicle N in a case where the state where the absolute value of the difference between the vehicle speed of the candidate vehicle for the communication continuation vehicle N and the vehicle speed of the communication continuation vehicle N continuing to perform the vehicle-to-vehicle communication is equal to or less than the speed threshold continues for the certain period of time.

The re-identification unit 17 does not necessarily have to perform the determination of the speed threshold. The re-identification unit 17 may re-identify the non-host vehicle in which the absolute value of the difference between the estimated relative distance and the relative distance of the host vehicle M is equal to or less than the distance threshold as the communication continuation vehicle N based on the non-host vehicle detection information acquired by the non-host vehicle detection information acquisition unit 11 and the estimated relative distance calculated by the estimated relative distance calculation unit 16. In this case, S26 of the flowchart that is illustrated in FIG. 4 is omitted.

Alternatively, the re-identification unit 17 may re-identify the non-host vehicle in which a state where the absolute value of the difference between the estimated relative distance and the relative distance from the host vehicle M is equal to or less than the distance threshold continues for a certain period of time as the communication continuation vehicle N as described above.

In addition, the re-identification unit 17 may not perform the re-identification stop processing that is illustrated in FIG. 5.

The preceding vehicle identification unit 13 loses the preceding vehicle N in a case where, for example, the preceding vehicle N turns right or left at an intersection first and then the preceding vehicle N temporarily falls out of the detection range of the external sensor 1 of the host vehicle M turning right or left at the intersection after the preceding vehicle N turns right or left at the intersection as well as the situation that is illustrated in FIG. 2B. The interrupting vehicle W is not present in this case, and thus replacement of the preceding vehicle N traveling directly in front of the host vehicle M does not occur.

In the vehicle identification device according to the aspect of the disclosure, the electronic control device may be configured to re-identify the non-host vehicle as the communication continuation vehicle when the non-host vehicle in which the absolute value of the difference between the calculated estimated relative distance and the relative distance from the host vehicle according to the non-host vehicle detection information is equal to or less than the distance threshold is present. In the vehicle identification device, the non-host vehicle is re-identified as the communication continuation vehicle (lost preceding vehicle) when the non-host vehicle in which the difference from the estimated relative distance between the lost preceding vehicle and the host vehicle is a relative distance equal to or less than the distance threshold is present. Accordingly, the re-identification can be performed within a short period of time.

In the vehicle identification device according to the aspect of the disclosure, the electronic control device may be configured not to re-identify the non-host vehicle as the communication continuation vehicle when an absolute value of a difference obtained by the recognized vehicle speed of the host vehicle and the relative vehicle speed of the non-host vehicle included in the non-host vehicle detection information being subtracted from the vehicle speed of the preceding vehicle acquired by the continuing vehicle-to-vehicle communication exceeds a speed threshold even in a case where the non-host vehicle in which the absolute value of the difference between the calculated estimated relative distance and the relative distance from the host vehicle according to the non-host vehicle detection information is equal to or less than the distance threshold is present. In the vehicle identification device, the re-identification is not performed, even in a case where the non-host vehicle in which the difference from the estimated relative distance between the lost preceding vehicle and the host vehicle is the relative distance equal to or less than the distance threshold is present, when the absolute value of the difference obtained by the vehicle speed of the host vehicle recognized by the vehicle speed recognition unit and the relative vehicle speed of the non-host vehicle included in the non-host vehicle detection information being subtracted from the vehicle speed of the preceding vehicle acquired by the continuing vehicle-to-vehicle communication exceeds the speed threshold. Accordingly, the vehicle identification device is capable of avoiding re-identification of a non-host vehicle other than the communication continuation vehicle (lost preceding vehicle).

In the vehicle identification device according to the aspect of the disclosure, the electronic control device may be configured to calculate the traveling distance of the preceding vehicle after the preceding vehicle has been lost based on the vehicle speed of the preceding vehicle acquired by the continuing vehicle-to-vehicle communication and calculate a traveling distance of the host vehicle after the preceding vehicle has been lost based on the recognized vehicle speed of the host vehicle, and stop the re-identification when a sum of the traveling distance of the preceding vehicle and the traveling distance of the host vehicle is equal to or greater than a re-identification stop threshold. In the vehicle identification device, the re-identification is stopped in a case where the sum of the traveling distance of the preceding vehicle and the traveling distance of the host vehicle from immediately before the preceding vehicle has been lost is equal to or greater than the re-identification stop threshold because the risk of erroneous re-identification of another non-host vehicle increases as the traveling distances of the preceding vehicle (communication continuation vehicle) and the host vehicle from immediately before the preceding vehicle has been lost increases. Accordingly, the vehicle identification device is capable of avoiding re-identification of a non-host vehicle other than the communication continuation vehicle (lost preceding vehicle).

What is claimed is:

1. A vehicle identification device comprising:
   an external sensor configured to detect a situation around a host vehicle;
   a vehicle speed sensor configured to detect a speed of the host vehicle;
   a communication unit configured to perform vehicle-to-vehicle communication with non-host vehicles; and
   an electronic control device configured to
      receive a detection result from the external sensor and acquire non-host vehicle detection information including a relative vehicle speed of the non-host vehicle with respect to the host vehicle and a relative distance between the host vehicle and the non-host vehicle based on the detection result,
      acquire non-host vehicle communication information including a vehicle speed of the non-host vehicle around the host vehicle by the vehicle-to-vehicle communication performed by the communication unit,
      identify a preceding vehicle traveling directly in front of the host vehicle from among the non-host vehicles in vehicle-to-vehicle communication with the host vehicle based on the acquired non-host vehicle detection information and the acquired non-host vehicle communication information,
      determine whether the external sensor has lost the preceding vehicle in a state where the vehicle-to-vehicle communication between the host vehicle and the preceding vehicle continues,
      recognize the vehicle speed of the host vehicle based on vehicle speed information detected by the vehicle speed sensor,
      calculate, when the electronic control device determines that the preceding vehicle has been lost, an estimated relative distance between the lost preceding vehicle and the host vehicle based on the relative distance between the preceding vehicle and the host vehicle according to the non-host vehicle detection information immediately before the preceding vehicle has been lost, a vehicle speed of the preceding vehicle acquired by the continuing vehicle-to-vehicle communication, and the recognized vehicle speed of the host vehicle, and re-identify a communication continuation vehicle that used to be the preceding vehicle based on the estimated relative distance and the relative distance between the non-host vehicle and the host vehicle according to the non-host vehicle detection information.

2. The vehicle identification device according to claim 1, wherein the electronic control device is configured to re-identify the non-host vehicle as the communication continuation vehicle when the non-host vehicle in which an absolute value of a difference between the calculated estimated relative distance and the relative distance from the host vehicle according to the non-host vehicle detection information is equal to or less than a distance threshold is present.

3. The vehicle identification device according to claim 2, wherein the electronic control device is configured not to re-identify the non-host vehicle as the communication continuation vehicle when an absolute value of a difference obtained by the recognized vehicle speed of the host vehicle and the relative vehicle speed of the non-host vehicle included in the non-host vehicle detection information being subtracted from the vehicle speed of the preceding vehicle acquired by the continuing vehicle-to-vehicle communication exceeds a speed threshold even in a case where the non-host vehicle in which the absolute value of the difference between the calculated estimated relative distance and the relative distance from the host vehicle according to the non-host vehicle detection information is equal to or less than the distance threshold is present.

4. The vehicle identification device according to claim 1, wherein the electronic control device is configured to calculate a traveling distance of the preceding vehicle after the preceding vehicle has been lost based on the vehicle speed of the preceding vehicle acquired by the continuing vehicle-to-vehicle communication and calculate a traveling distance of the host vehicle after the preceding vehicle has been lost based on the recognized vehicle speed of the host vehicle, and stop the re-identification when a sum of the traveling distance of the preceding vehicle and the traveling distance of the host vehicle is equal to or greater than a re-identification stop threshold.

5. A vehicle identification method using a vehicle identification device including an electronic control device, an external sensor configured to detect a situation around a host vehicle, a vehicle speed sensor configured to detect a speed of the host vehicle, and a communication unit configured to perform vehicle-to-vehicle communication with non-host vehicles, the vehicle identification method comprising:

receiving a detection result from the external sensor and acquiring non-host vehicle detection information including a relative vehicle speed of the non-host vehicle with respect to the host vehicle and a relative distance between the host vehicle and the non-host vehicle based on the detection result;

acquiring non-host vehicle communication information including a vehicle speed of the non-host vehicle around the host vehicle by the vehicle-to-vehicle communication performed by the communication unit;

identifying a preceding vehicle traveling directly in front of the host vehicle from among the non-host vehicles in vehicle-to-vehicle communication with the host vehicle based on the acquired non-host vehicle detection information and the acquired non-host vehicle communication information;

determining whether or not the external sensor has lost the preceding vehicle in a state where the vehicle-to-vehicle communication between the host vehicle and the preceding vehicle continues;

recognizing the vehicle speed of the host vehicle based on vehicle speed information detected by the vehicle speed sensor;

calculating, when the electronic control device determines that the preceding vehicle has been lost, an estimated relative distance between the lost preceding vehicle and the host vehicle based on the relative distance between the preceding vehicle and the host vehicle according to the non-host vehicle detection information immediately before the preceding vehicle has been lost, a vehicle speed of the preceding vehicle acquired by the continuing vehicle-to-vehicle communication, and the recognized vehicle speed of the host vehicle; and re-identifying a communication continuation vehicle that used to be the preceding vehicle based on the estimated relative distance and the relative distance between the non-host vehicle and the host vehicle according to the non-host vehicle detection information.

6. The vehicle identification method according to claim 5, wherein the non-host vehicle is re-identified as the communication continuation vehicle when the non-host vehicle in which an absolute value of a difference between the calculated estimated relative distance and the relative distance from the host vehicle according to the non-host vehicle detection information is equal to or less than a distance threshold is present.

7. The vehicle identification method according to claim 6, wherein the non-host vehicle is not re-identified as the communication continuation vehicle when an absolute value of a difference obtained by the recognized vehicle speed of the host vehicle and the relative vehicle speed of the non-host vehicle included in the non-host vehicle detection information being subtracted from the vehicle speed of the preceding vehicle acquired by the continuing vehicle-to-vehicle communication exceeds a speed threshold even in a case where the non-host vehicle in which the absolute value of the difference between the calculated estimated relative distance and the relative distance from the host vehicle according to the non-host vehicle detection information is equal to or less than the distance threshold is present.

8. The vehicle identification method according to claim 5, wherein:

a traveling distance of the preceding vehicle after the preceding vehicle has been lost is calculated based on the vehicle speed of the preceding vehicle acquired by the continuing vehicle-to-vehicle communication and a traveling distance of the host vehicle after the preceding vehicle has been lost is calculated based on the recognized vehicle speed of the host vehicle; and the re-identification is stopped when a sum of the traveling distance of the preceding vehicle and the traveling distance of the host vehicle is equal to or greater than a re-identification stop threshold.

* * * * *